United States Patent

Yamada et al.

[11] Patent Number: 5,956,152
[45] Date of Patent: Sep. 21, 1999

[54] DOCUMENT READING APPARATUS

[75] Inventors: Makoto Yamada, Gifu; Tomohisa Higuchi, Nagoya, both of Japan

[73] Assignee: Brother Kogyo Kabushiki Kaisha, Nagoya, Japan

[21] Appl. No.: 08/846,495

[22] Filed: Apr. 28, 1997

[30] Foreign Application Priority Data

May 17, 1996 [JP] Japan ................................. 8-123745

[51] Int. Cl.$^6$ ................................................. H04N 1/36
[52] U.S. Cl. .................... 358/412; 358/296; 358/496; 358/498; 358/408
[58] Field of Search ............................... 358/296, 494, 358/408, 419, 496, 498, 412

[56] References Cited

U.S. PATENT DOCUMENTS

| | | | |
|---|---|---|---|
| 4,095,248 | 6/1978 | Kolker et al. ........................... | 358/288 |
| 4,360,840 | 11/1982 | Wolfrum et al. ........................ | 358/261 |
| 5,038,222 | 8/1991 | Saito ....................................... | 358/496 |
| 5,537,219 | 7/1996 | Morikawa et al. ..................... | 358/494 |
| 5,579,129 | 11/1996 | Iwata et al. ............................. | 358/498 |
| 5,691,826 | 11/1997 | Yeh et al. ............................... | 358/498 |
| 5,798,841 | 8/1998 | Takahashi ............................... | 358/296 |

*Primary Examiner*—Arnelia Au
*Assistant Examiner*—Gilberto Frederick, II
*Attorney, Agent, or Firm*—Oliff & Berridge, PLC

[57] ABSTRACT

A document reading apparatus is provided with a feed roller that feeds a document in its feeding direction while making contact therewith, a rotation driving power source that rotationally drives the feed roller, and a power transmitting mechanism enabled to transmit rotational driving power from the rotation driving power source to the feed roller. Two driving paths, each having a reduction ratio different from the other corresponding to two resolutions, are provided at at least one part of the power transmitting mechanism and a planetary gear for selecting one of the driving paths as a transmitting path of the aforesaid rotational driving power is provided at a branch point of the power transmitting mechanism. Which resolution to select is determined and selection of the driving path is controlled by a selector based on the result of the determination.

24 Claims, 6 Drawing Sheets

0
DOCUMENT READING APPARATUS

BACKGROUND OF THE INVENTION

1. Field of the Invention

This invention relates to a document reading apparatus such as a facsimile machine and a scanner.

2. Description of Related Art

When an apparatus, such as a facsimile machine, which is capable of reading and printing a document, makes a copy of a document by reading a document and printing the read document as it is, a copied image is enlarged or reduced if the resolution for reading a document differs from that for printing a document. To avoid this, resolution conversion is required. Resolution conversion by either a software- or hardware-based method tends to produce moire patterns (a series of light and dark patterns) on a copied image. As a result, the printing quality becomes inferior to that attained in a case where the resolution for reading and that for copying are the same.

Even when the resolution for reading and that for printing are the same, if the reading resolution of the facsimile machine differs from that defined by the communication standards, resolution conversion is required to prevent such a difference of image size because the resolution of the reading apparatus in the main scanning direction (in a direction in which a reading sensor detects an image in one detecting operation) is not changeable.

SUMMARY OF INVENTION

As for the sub-scanning direction (perpendicular to the main scanning direction), the above-mentioned problem can be solved by driving a document feed roller using a motor with a resolving power equivalent to the least common multiple of at least two different resolutions (e.g. the resolution required for image printing and that defined by the communication standards) and by changing the motor driving speed according to the required resolution.

However, to change the motor driving speed as described above, a smaller step angle is required for the motor and the rotation speed of the motor needs to be increased. Accordingly, an expensive hybrid motor is required. For instance, to switch the resolution between 400 dpi (dots per inch) and 600 dpi, a motor with a high resolving power corresponding to a resolution of 1200 dpi, which is the least common multiple of 400 dpi and 600 dpi, is required, and the use of such a motor will increase the cost.

In view of the foregoing, an object of the invention is to provide a document reading apparatus which can read a document by selecting an appropriate resolution from a plurality of resolutions in the sub-scanning direction instead of by increasing the motor resolving power needlessly.

To achieve the above-mentioned object, a document reading apparatus is provided which can read a document in a predetermined direction at a plurality of resolutions. The document reading apparatus includes a reading unit that reads the document; a driving member that drives at least one of the document or the reading unit to shift a document reading position in a predetermined direction; a driving power source that drives the driving member; and a power transmitting mechanism enabled to transmit driving power from the driving power source to the driving member, the power transmitting mechanism including a plurality of driving paths, each having a reduction ratio different from the other corresponding to a plurality of resolutions and a selector that selects any one of the driving paths as a transmitting path of the driving power. The document reading apparatus may further include a determiner that determines which resolution to select and a select controller that controls selection of the driving path by the selector based on the result of determination by the determiner.

The above arrangement allows selection of the driving path, according to the selected resolution, from a plurality of driving paths provided for the power transmitting mechanism. Since the document reading position shifts in the predetermined direction at a speed corresponding to the selected resolution, there is no need to set the resolving power of the driving power source to such a high value that is equivalent to the least common multiple of the required resolutions. Therefore, an inexpensive document reading apparatus can be implemented while saving the cost of a driving power source for shifting the document reading position and its control.

According to another object of the invention, a document reading apparatus is provided which can read a document in its feeding direction at a plurality of resolutions. The document reading apparatus includes a feeding member that feeds a document in a feeding direction; a driving power source that drives the feeding member; and a power transmitting mechanism enabled to transmit driving power from the driving power source to the feeding member the power transmitting mechanism including a plurality of driving paths, each having a reduction ratio different from the other corresponding to a plurality of resolutions and a selector that selects one of the driving paths as a transmitting path of the driving power. The document reading apparatus may further include a determiner that determines which resolution to select and a select controller that controls selection of the driving path by the selector based on the result of determination by the determiner.

The above arrangement allows selection of the driving path from a plurality of driving paths provided for the power transmitting mechanism, corresponding to the resolution selected from a plurality of resolutions. Since the document is fed in the predetermined direction at a speed corresponding to the selected resolution, there is no need to set the resolving power of the driving power source to such a high value that is equivalent to the least common multiple of the required resolutions. Therefore, an inexpensive document reading apparatus can be implemented while saving the cost of a driving power source for document feeding and its control.

According to still another object of the invention aspect, a document reading apparatus is provided which can read a document in its feeding direction at two resolutions. The document reading apparatus includes a feed roller that feeds the document in its feeding direction while making contact therewith; a rotation driving power source that rotationally drives the feed roller; and a power transmitting mechanism enabled to transmit rotational driving power from the rotation driving power source to the feed roller, the power transmitting mechanism including two driving paths, each having a reduction ratio different from the other corresponding to two resolutions and a selector that selects one of the driving paths as a transmitting path of the rotational driving power. The document reading apparatus may further include a determiner that determines which resolution to select and a select controller that controls selection of the driving path by the selector based on the result of determination by the determiner.

The above arrangement allows the use of one of the two driving paths provided for the power transmitting mechanism corresponding to the resolution selected from the two resolutions. Since the document is fed in the predetermined direction at a speed corresponding to the selected resolution, there is no need to set the resolving power of the driving power source to such a high value that is equivalent to the least common multiple of the two resolutions. Therefore, an inexpensive document reading apparatus can be implemented while saving the cost of the driving power source for document feeding and its control.

Further, the document reading apparatus may be provided with a motor, which can rotate in both directions, as the rotation driving power source. As a selector, a planetary gear may be provided which engages, depending on the direction of given rotational driving power, with one of selecting gears provided respectively at input ends of the two driving paths, and which transmits the rotational driving power from the motor to the driving paths. The select controller may be arranged to change the rotation direction of the motor according to the result of the resolution determination.

The above arrangement allows the same motor to be used commonly for driving the document feed roller and for selecting the driving path. Therefore, compared with a case where two drive motors are provided separately, a less expensive and more compact document reading apparatus can be implemented while saving the cost and the installation space for an extra driving power source.

Further, the document reading apparatus may be provided with a holder that holds the planetary gear in a neutral position where the planetary gear is not engaged with either of the selecting gears which are provided respectively for the two driving paths. This arrangement allows the rotation driving power source and the feed roller to be disconnected when the document does not need to be fed, which improves the response and reduces the feeding error at the start of the next document feeding. If the same arrangement is adopted when the document is jammed, the document will be easily removed.

Further, the document reading apparatus may be provided with a transmission unit that transmits information related to the result of reading the document, a copying unit forming an image on a recording paper based on the result of reading the document, and a switch that switches between the transmission unit and the copying unit depending on which device is used. The determiner determines the resolution based on the result of switching by the switch. This arrangement allows the document to be fed automatically at an optimal speed according to which status is selected, data transmission or image copying, by a user.

Further, in the document reading apparatus having at least a resolution appropriate to the communication standards and a resolution suitable for image copying, the determiner and the selector may be arranged so that the result of determination by the determiner corresponds to the result of selection by the selector in the following manner. The driving path for the resolution appropriate to the communication standards is selected when the use of the transmission unit is selected by the switch, and the driving path for the resolution suitable for image copying is selected when the use of the copying unit is selected.

Consequently, for data transmission, data obtained by reading the document at the resolution appropriate to the communication standards can be transmitted without complicated resolution conversion. And for image copying, a high quality copied image can be obtained by reading the document at a higher resolution than that appropriate to the communication standards. On the other hand, a copied image can be quickly obtained by reading the document at a lower resolution than that appropriate to the communication standards.

Further, the document reading apparatus having two resolutions may be structured so that each resolution is not an integral multiple of the other. When one resolution is an integral multiple of the other, data of a low resolution can be easily generated by thinning out, with respect to the sub-scanning direction, the data obtained by feeding the document at a speed corresponding to a high resolution. However, when each resolution is not an integral multiple of the other, such conversion is impossible, thus it is desired that the document feeding speed is changed in combination with the forgoing arrangements.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

Figure 4:
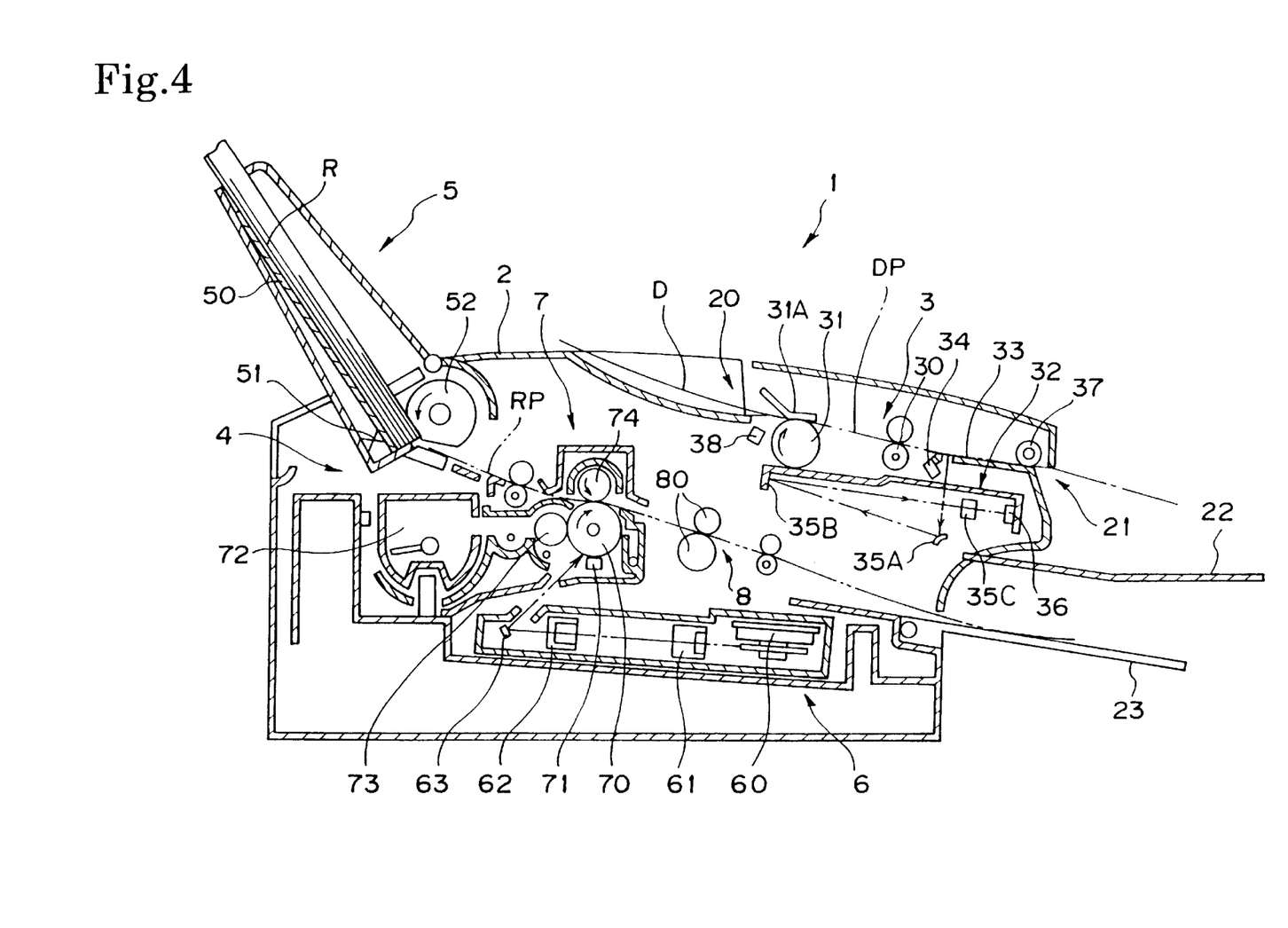
FIG. 4 is a cross-sectional view of a facsimile machine of the preferred embodiment of the invention.

FIG. 4 is a cross-sectional view of a facsimile machine according to the invention. A facsimile machine 1 includes a body case 2 made of synthetic resin, for example, a document reading section 3 provided at the upper portion within the body case 2, and an image forming section 4 spreading from the rear end of the body case 2 to the lower potion of the document reading section 3.

The document reading section 3 is provided with a document feed roller 30, a separation piece 31A provided so as to make contact with the top end of a separation roller 31 on the upstream side of the document feed roller 30, and a reading unit 32. A document D inserted from a document inlet 20 of the body case 2 is fed to the feed roller 30, while being separated one by one by the separation roller 31 and the separation piece 31 A, and is fed further along a document feeding path DP corresponding to the rotation of the feed roller 30 in the direction of the arrow shown in FIG. 1. The present document feeding direction is the sub-scanning direction of the document D, while the direction perpendicular thereto (width direction of the document D) is the main scanning direction of the document D.

An image on the document D is read by the reading unit 32 at a midway point on the document feeding path DP. In the reading unit 32, the document D guided by a document support plate 33 is radiated, uniformly in a predetermined area along the main scanning direction, with light emitted from a light source 34, and the reflected light is guided to a line sensor 36 via mirrors 35A and 35B and a lens 35C. The line sensor 36 outputs electric signals corresponding to the intensity distribution of the reflected light in the main scanning direction, and the electric signals are processed as data read from the document D by a control unit to be described later. The document D which has been read passes through a discharge roller 37 and the document support plate 33 and is discharged from a document outlet 21 to a document receiver 22 sequentially. The means by which the document feed roller 30 is driven will be described later. Provided in the vicinity of the document inlet 20 is a document sensor 38 which judges whether the document D is present.

The image forming section 4 is provided with a paper feed unit 5, which feeds recording paper R cut to a predetermined size one by one, a laser scanner unit 6 that forms an image on the recording paper fed from the paper feed unit 5, a process unit 7, and a fixing unit 8. In the paper feed unit 5, recording paper R stacked on a pressing plate 50 is fed one by one to a recording paper feeding path PR by a paper feed roller 52 rotating in the direction of the arrow shown in FIG. 4 while being pressed against the paper feed roller 52 by a spring 51. The laser scanner unit 6 guides laser beams emitted from a laser emitter (not shown) onto a photosensitive drum 70 of the process unit 7 via a polygon mirror 60, lenses 61 and 62 and a mirror 63. The polygon mirror 60 is driven to rotate around its vertical axis in synchronization with laser beam emission, and as the polygon mirror rotates, the laser beams are directed in the axial direction of the photosensitive drum 70 (in a direction perpendicular to the recording paper surface in FIG. 4).

The photosensitive drum 70 of the process unit 7 is driven to rotate in the direction of the arrow shown in FIG. 4. When the photosensitive drum 70 rotates, its surface is charged by a charger 71, and then the surface of the photosensitive drum 70 is scanned using the laser beams emitted from the laser scanner unit 6 to form an electrostatic latent image based on the potential difference between the radiated portion and the non-radiated portion. After the electrostatic latent image is formed, toner supplied from a toner box 72 is supplied to an outer peripheral side of the photosensitive drum 70 by a developing roller 73. The electrostatic latent image is thereby converted into a toner image, and then transferred onto the surface of the recording paper R by a transfer roller 74.

The recording paper R onto which the toner image is transferred is guided to between a pair of fixing rollers 80 and 80 provided for the fixing unit 8. A heater such as a halogen lamp is incorporated into one of the fixing rollers 80 and 80, and the toner image is fixed onto the recording paper R by means of heat and pressure applied to the recording paper sandwiched between the fixing rollers 80 and 80. The recording paper R with the toner image fixed thereto is discharged to a paper discharge tray 23.

Figure 1:
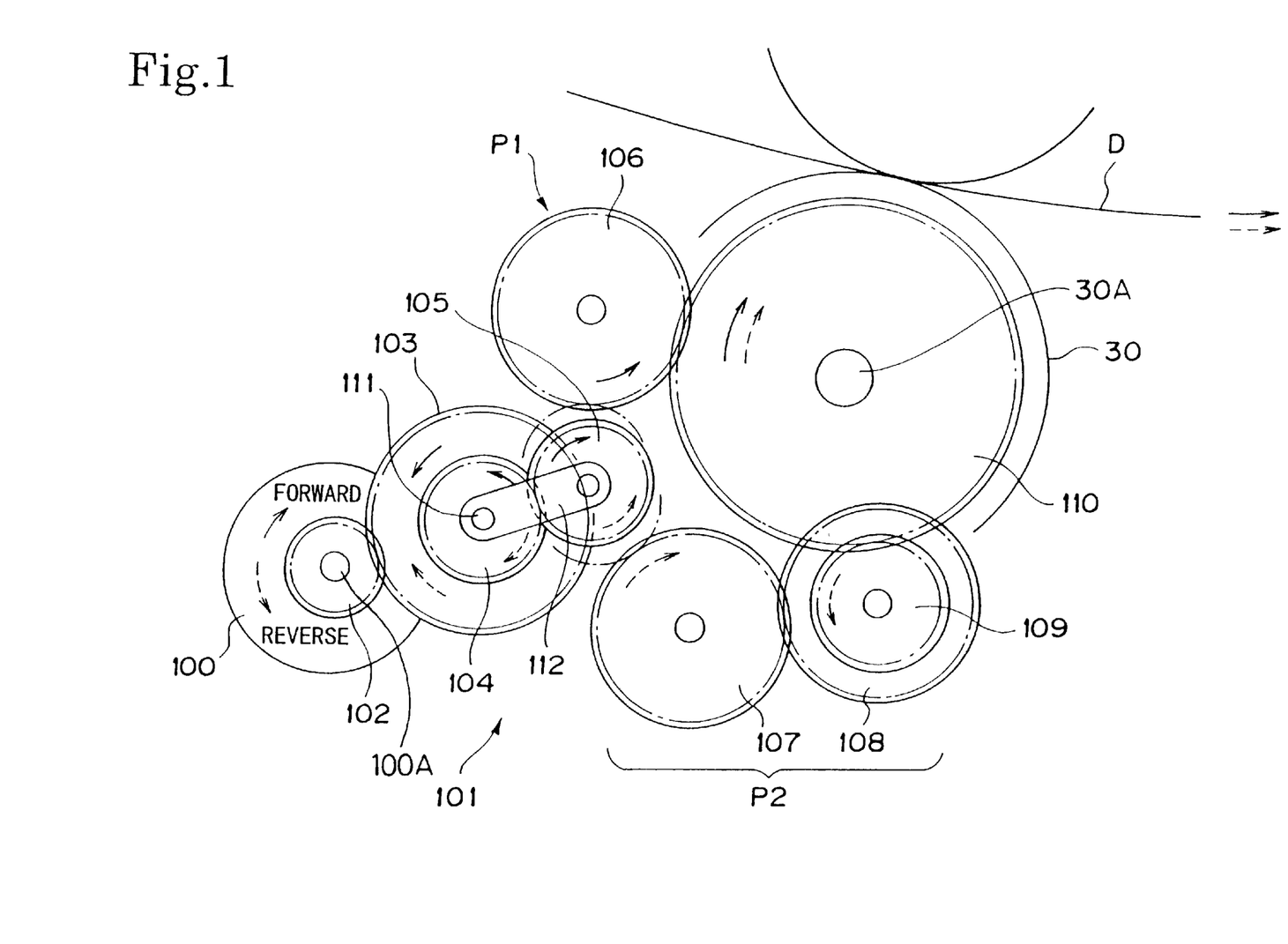
FIG. 1 is a drawing showing a driving mechanism of a document feed roller according to a preferred embodiment of the invention.

FIG. 1 shows a driving mechanism of the document feed roller 30 which has been described above. As shown in FIG. 1, a pulse motor 100 which can rotate in both forward and reverse directions is provided as a driving power source of the document feed roller 30. A row of driving gears 101 is provided as a power transmitting mechanism that transmits driving power of the pulse motor 100 to the document feed roller 30. Rotation of the output shaft 100A of the pulse motor 100 clockwise in FIG. 1 is referred to as "FORWARD" and rotation of the output shaft 100A counterclockwise in FIG. 1 is referred to as "REVERSE". However, these expressions are used only to distinguish the rotation directions and do not imply their master-slave relationship or frequencies. In addition, in FIG. 1, the rotation directions of gears when the pulse motor rotates in the forward direction are shown by solid arrows while those when the pulse motor rotates in the reverse direction are shown by broken arrows.

The row of driving gears 101 (the teeth on the gears are not shown) includes a pinion 102 attached to the output shaft 100A of the pulse motor 100, a first intermediate gear 103 engaging with the pinion 102, a second intermediate gear 104 rotating integrally and coaxially with the first intermediate gear 103, a planetary gear 105 engaging with the second intermediate gear 104, a first selecting gear 106 placed on one side of the planetary gear 105, a second selecting gear 107 placed on the other side thereof, a first reversing gear 108 engaging with the second selecting gear 107, a second reversing gear 109 rotating integrally and coaxially with the first selecting gear 108, and a roller driving gear 110 engaging with both first selecting gear 106 and second reversing gear 109.

The pulse motor 100 and the gears 103, 104, 106, 007, 108 and 109 are supported respectively by the body case 2. The roller driving gear 110 is provided to rotate integrally and coaxially with a center shaft 30A of the document feed roller 30. An arm is rotatably attached to a center shaft 111 of the first and second intermediate gears 103 and 104, and the planetary gear 105 is rotatably attached to the end of the arm 112. Appropriate friction is applied to and between the arm 112 and the second intermediate gear 104 by means of, for example, a disc spring so that when the second intermediate gear 104 rotates the arm 112 oscillates in the same direction that the second intermediate gear 104 rotates.

When the arm 112 oscillates, the planetary gear 105 engages with the first selecting gear 106 or the second selecting gear 107 depending on the arm's oscillating direction (see the phantom lines in FIG. 1). Consequently, rotational movement of the pinion 102 is transmitted to the roller driving gear 110 to drive the document feed roller 30. In short, the rotation is transmitted to the document feed roller 30 through the driving path P1 formed of only the first selecting gear 106 when the pulse motor rotates in the forward direction, and through the driving path P2 formed of the second selecting gear 107 and the reversing gears 108 and 109 when the pulse motor 100 rotates in the reverse direction. The rotation direction of the roller driving gear 110 remains the same by employing the proper number of gears on P1 or P2 no matter which driving path, P1 or P2, is selected.

When reading resolutions in the sub-scanning direction required for data transmission and image copying are set to be R1 dpi and R2 dpi, respectively, the reduction ratio of the driving path P2 is set to be R2/R1 times that of the driving path P1. For instance, when resolutions for data transmission and for document copying in the super fine mode are 400 dpi and 600 dpi, respectively, the reduction ratio of the driving path P2 is 1.5 that of the driving path P1. Setting the reduction ratios in this way allows the pulse motor 100 to rotate at a constant speed no matter how high/low the required resolution is. Here, the reduction ratio represents the value (N1/N2) obtained by dividing the speed input to the driving path N1 by that output from the driving path N2.

Moreover, the reduction ratio is set from the pinion 102 to the document feed roller 30 so that the document D shifts by 1/R1 inches when the pulse motor 100 rotates forward by 1 step, and by 1/R2 inches when the pulse motor rotates reversely by 1 step, in other words, the document D shifts by 1 inch respectively when the pulse motor 100 rotates forward by R1 steps and reversely by R2 steps.

Figure 2:
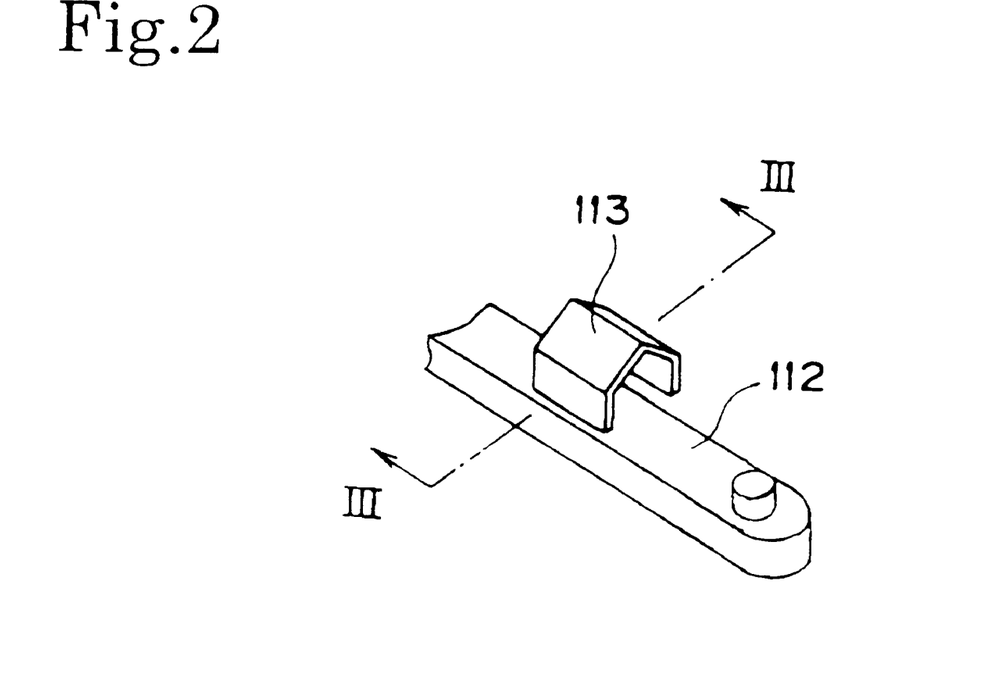
FIG. 2 is an exploded perspective view showing a leaf spring that holds a planetary gear in a neutral position in the driving mechanism shown in FIG. 1.
Figure 3:
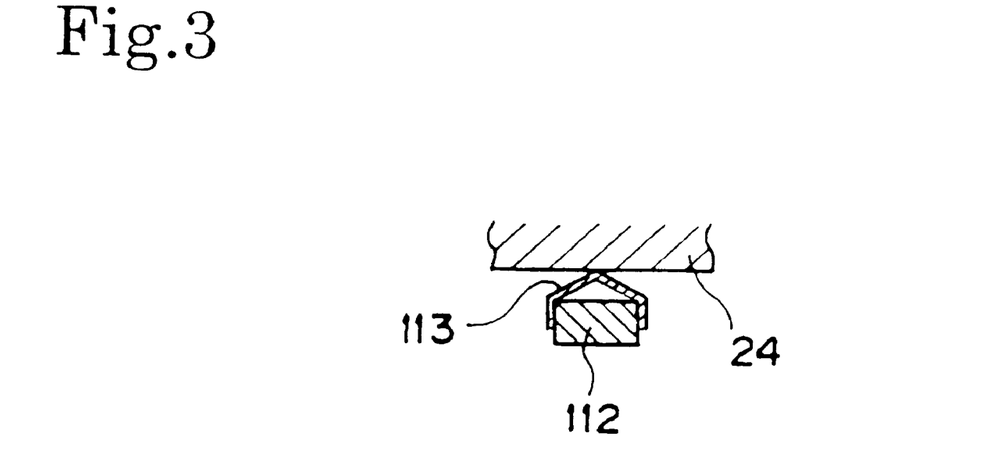
FIG. 3 is a cross-sectional view taken along the lines III—III of FIG. 2.

As shown in FIGS. 2 and 3, a leaf spring 113 is attached at a midpoint of the arm 112 to apply resistance to the oscillating arm. When the arm 112 is assembled into a predetermined position, the leaf spring 113 is pressed against an inner frame 24 of the body case 2 and deformed elastically. Resiliency of the leaf spring generates resistance against the motion of the arm 112. This prevents the arm 112 from falling due to gravity and permits the planetary gear 105 to be held in a neutral position (in a position shown by a solid line in FIG. 1), where the planetary gear is engaged with neither of the first and second selecting gears, when the rotational center shaft 111 of the arm 112 is horizontally provided and the arm 112 oscillates vertically.

Figure 7:
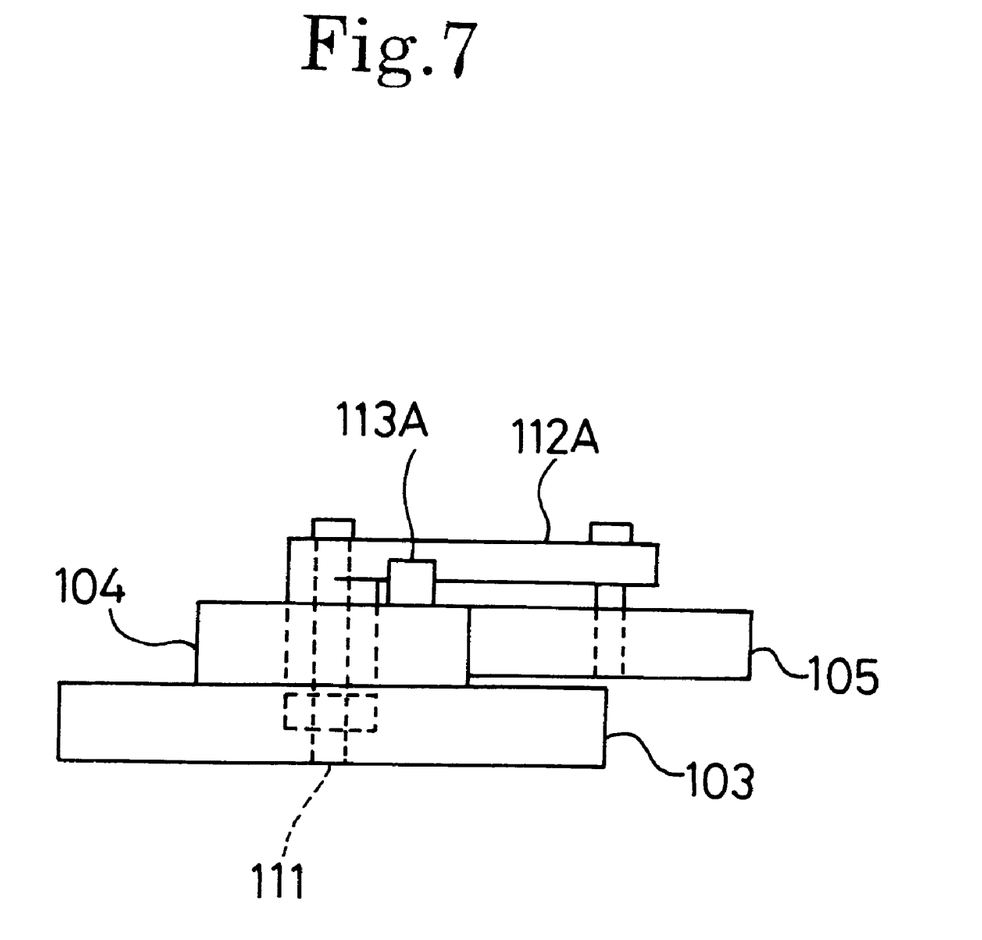
FIG. 7 shows an alternative embodiment wherein the leaf spring is in a different position from that shown in FIG. 2.

FIG. 7 shows an alternative embodiment wherein the leaf spring is in a different position from that shown in FIG. 2. In FIG. 7, leaf spring 113A is attached to an end of an arm 112A adjacent to the rotational center shaft 111. When the arm 112A is assembled into a predetermined position, the spring 113A in this position is pressed against the second intermediate gear 104 to provide resistance against the motion of arm 112A. This alternative embodiment reduces wear on the inner frame 24.

Upon the completion of the document D feeding, by stopping the planetary gear 105 in the above-mentioned neutral position by rotating the pulse motor 100 in the direction opposite to that it has been rotating, the response is improved and the error is reduced at the start of the next document feeding. If the same arrangement is adopted when the document is jammed, the document feed roller 30 is not engaged with the pulse motor 100 and can be rotated freely, facilitating removal of the jammed document D from the document feeding path DP.

Figure 5:
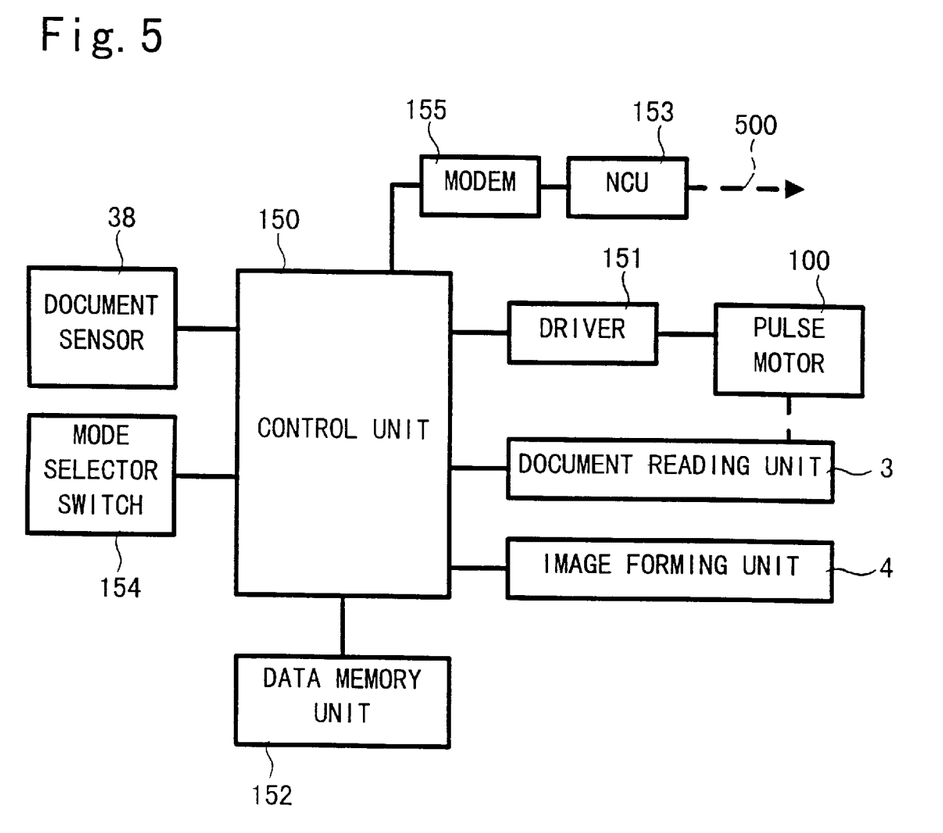
FIG. 5 is a block diagram outlining a control system of the apparatus shown in FIG. 4.

FIG. 5 is a block diagram outlining a control system of the facsimile machine of the preferred embodiment of the invention. The control system is mainly formed of a control unit 150. The control unit 150, formed of, for example, a microcomputer and various peripheral circuits necessary for the operation of the control unit, executes computations and various programs necessary for operation of each part of the facsimile machine 1. Various control devices (the detail of which is omitted) for the above-mentioned document sensor 38, document reading section 3 and image forming section 4 are connected to the control unit 150. The pulse motor 100 is also connected thereto via a driver 151.

In addition, a data memory unit 152, a modem connected to a NCU (network control unit) 153 and mode selector switch 154 are connected respectively to the control unit 150. The data memory unit 152 is formed of, for example, a solid-state memory and circuits necessary for data reading/writing therefrom/thereto. The NCU 153 and the modem 155 perform control necessary for transmitting and receiving facsimile machine data to and from other devices via a communication line 500 (for example, a telephone line). The mode selector switch 154 is used by a user to select the facsimile mode or the copy mode and a signal corresponding to the selected mode is output to the control unit 150. The facsimile mode is designed to transmit the data read from the document by the document reading section 3 to other devices via the modem 155 and the NCU 153, while the copy mode is designed to copy the data read from the document onto the recording paper R (see FIG. 4) by the image forming section 4.

Figure 6:
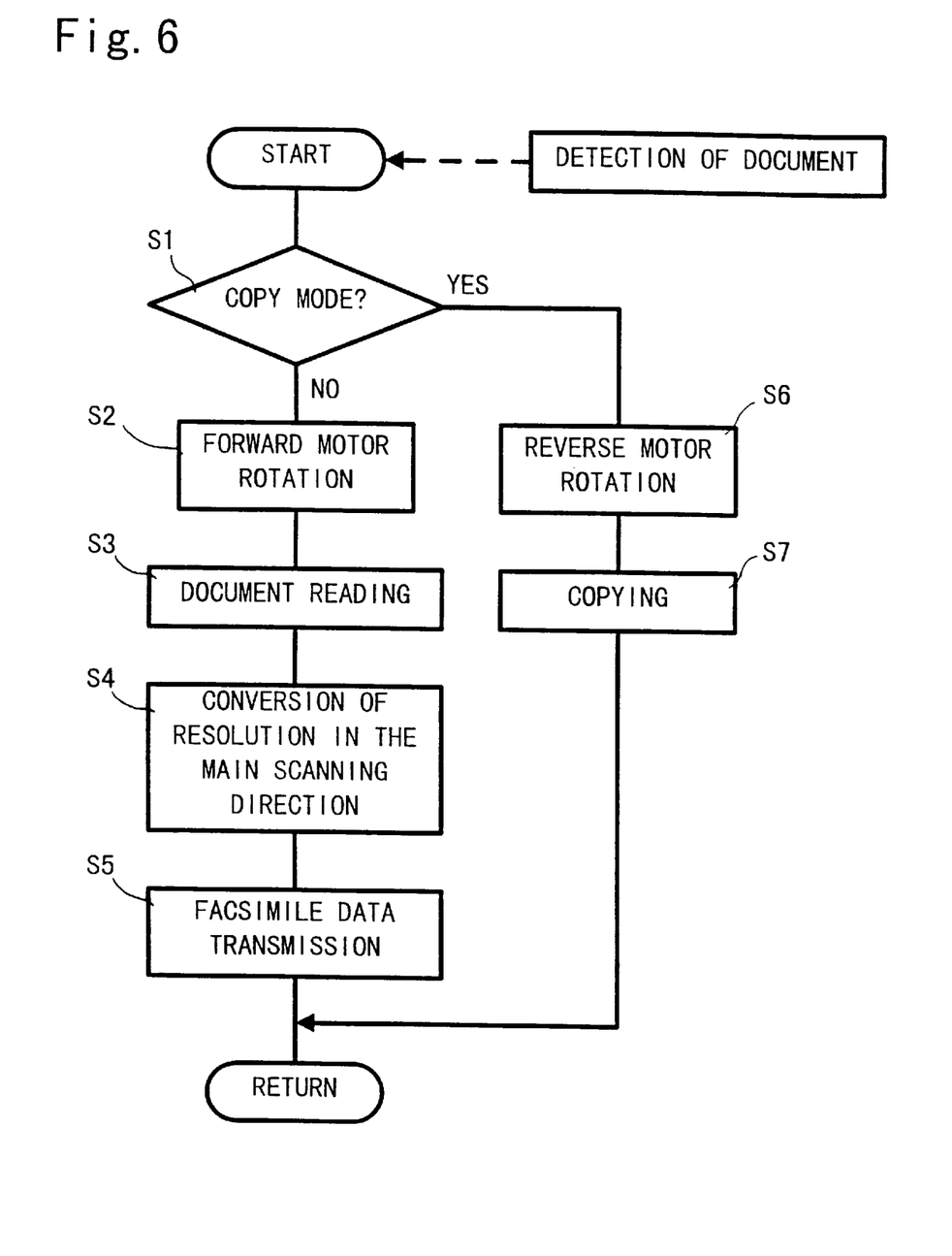
FIG. 6 is a flowchart showing the document feeding and related process executed by the control unit shown in FIG. 5.

FIG. 6 is a flowchart showing the document D reading process, which is among various processes executed by the above-mentioned control unit 150. When the document D is inserted from the document inlet 20 (see FIG. 4), a predetermined document detecting signal is output from the document sensor 38 to the control unit 150. Corresponding to the output signal, the control unit 150 interrupts the process in progress and executes document reading as shown in FIG. 6.

First, in step S1 of the process shown in FIG. 6, whether the copy mode is selected is judged based on the signal output from the mode selector switch 154. If the copy mode is not selected, that is, the facsimile mode is selected, the pulse motor 100 starts rotating forward in step S2. Subsequently, the planetary gear 105 shown in FIG. 1 engages with the first selecting gear 106, and the document D is fed at a speed suitable for the reading resolution R1 dpi in the sub-scanning direction for data transmission of the document D.

In step S3, document D reading is started by the reading unit 32 (FIG. 4) and continues until the pulse motor 100 rotates a predetermined number of steps after the document detecting signal has not been detected from the document sensor 38. Data read by the reading unit 32 is processed as required and stored in the data memory unit 152.

Upon the completion of document reading, step S4 is reached, where conversion of the resolution in the main scanning direction is performed. To be specific, when the resolution of the line sensor 36 (FIG. 4) does not correspond to the resolution appropriate to the communication standards, with respect to the same scanning direction (i.e. the main scanning direction), the read data is adjusted to the latter. For instance, when the resolution for data transmission in the main scanning direction in the super fine mode is 200 dpi and that for image copying is 600 dpi, the resolving power of the line sensor 36 is designed to correspond to a high resolution of 600 dpi. Thus, the data read at 600 dpi in the main scanning direction needs to be converted into 200 dpi. Upon the completion of resolution conversion in the main scanning direction, the read data is transmitted via the modem 155 and the NCU 153 in step S5, and after the completion of data transmission, the process returns to the operation having being executed before the interruption entering into the document reading process shown in FIG. 6.

On the other hand, when the selected mode is judged to be the copy mode in step S1, step S6 is reached, where the pulse motor 100 starts rotating reversely. Accordingly, the planetary gear 105 in FIG. 1 engages with the second selecting gear 107, and the document D is fed at a speed suitable for the reading resolution R2 dpi in the sub-scanning direction for document copying. In the following step S7, the document D is read by the reading unit 32 (FIG. 4) and the read data is output to the image forming section 4, and then the image on the document D is copied onto the recording paper R. This process continues until the last sheet of the document has been copied. After the completion of copying, the process being performed before the interruption shown in FIG. 6 returns.

A resolution of 400 dpi in the sub-scanning direction used for the above-mentioned data transmission is the one used in the super fine mode of the facsimile communication standards. When data transmission is performed in another mode such as fine mode (200 dpi in the sub-scanning direction) or standard mode (100 dpi in the sub-scanning direction), data of the desired resolution can be obtained by thinning out the data read at 400 dpi in the super fine mode or by driving the pulse motor 100 by several steps for each sub-scanning (e.g. 2 steps for the fine mode).

In the preferred embodiment shown above, the resolution in the sub-scanning direction is 600 dpi. However, when 300 dpi is desired, it can be obtained by arranging the driving path P2 so that the reduction ratio of the driving path P2 is 0.75 times that of the driving path P1, or by driving the step motor 100 by 2 steps for each sub-scanning while leaving the reduction ratio of the driving path P2 the same as in the above preferred embodiment.

The document feed roller 30 generally corresponds to a driving member, the pulse motor 100 generally corresponds to a driving power source, the planetary gear 105 generally corresponds to a selector, the modem 155 and the NCU 153 generally correspond to a transmission unit, the image forming section 4 generally corresponds to a copying unit, and the mode selector switch 154 generally corresponds to a switch, respectively.

As for the hardware, the control unit 150 generally corresponds to a determiner and a select controller, and more precisely, step S1 in FIG. 6 generally corresponds to the function of the determiner and steps S2 and S3 generally correspond to the function of the select controller.

In the above preferred embodiment, only the document feed roller 30 is driven by the pulse motor 100. The paper discharge roller 37 may also be driven by the same pulse motor 100 by adding a row of gears from the roller driving gear 110, or from the gear coaxial therewith to the paper discharge roller. Instead of feeding the document D, shifting the reading position in the sub-scanning direction by driving the line sensor 36, or an optical member for guiding the reflected light to the line sensor is within the scope of the invention.

The document may be fed using a belt instead of the roller. The power transmitting mechanism may be formed of not only a row of gears but also belts, friction wheels, clutches and other various power transmitting elements. An actuator such as a solenoid, or a clutch may be used in place of the planetary gear 105 to switch the driving path.

Although a case where the resolution for data transmission differs from that for image copying has been described in the above preferred embodiment, the invention can be applied to cases where two resolutions other than those described in the above preferred embodiment, or three or more resolutions are required. For instance, different resolutions for data transmission, printing, and scanning functions may be set in a so-called multi-function facsimile machine. The multi-function facsimile machine is connected to a host unit including a personal computer and can be used not only to receive/transmit data but also used as a printer and a scanner according to the instruction from the host unit. When the resolution for scanning function in the sub-scanning direction is 450 dpi, and 400 dpi and 600 dpi are required for data transmission and printing functions respectively, a pulse motor with an extremely high resolving power has been conventionally required to be compatible with a resolution (43200 dpi) equivalent to the least common multiple of the required resolutions (400 dpi, 600 dpi, and 450 dpi). On the contrary, such a situation can be coped with by the invention without increasing the resolution of the pulse motor, by providing first, second, and third driving paths which correspond to 400 dpi, 600 dpi, and 450 dpi, respectively, and which are switchable based on the resolutions suitable for desired functions.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A document reading apparatus which can read a document along a predetermined direction at a plurality of resolutions, the document reading apparatus comprising:

a reading unit that reads the document;

a driving member that drives at least one of the document and the reading unit to shift a document reading position in the predetermined direction at speeds corresponding respectively to the plurality of resolutions;

a driving power source that drives the driving member; and a power transmitting mechanism that transmits driving power from the driving power source to the driving member, the power transmitting mechanism comprising a plurality of driving paths, each having a reduction ratio different from the other corresponding respectively to one of the plurality of resolutions and a selector that selects any one of the driving paths as a driving path for transmitting the driving power so that the driving member is driven at a speed corresponding to the respective resolution associated with the selected driving path.

2. The document reading apparatus according to claim 1, further comprising:

a determiner that determines which of the plurality of resolutions to select; and a select controller that controls selection of the driving path by the selector based on the result of determination by the determiner.

3. The document reading apparatus as claimed in claim 2, wherein the driving power source comprises a bi-directionally rotatable motor; the selector comprises a planetary gear which engages, depending on a direction of rotation driving power, with one of selecting gears provided respectively at input ends of the two driving paths; and the select controller changes a rotation direction of the motor according to a result of the resolution determination by the determiner.

4. The document reading apparatus as claimed in claim 3, wherein the motor is a bi-directionally rotatable pulse motor.

5. The document reading apparatus as claimed in claim 3, further comprising a holder that holds the planetary gear in a neutral position where the planetary gear is not engaged with either of the selecting gears.

6. The document reading apparatus as claimed in claim 5, wherein the selector controller rotates the motor in a first direction to engage the planetary gear with one of the selecting gears to begin document reading and rotates the motor in a second direction opposite to the first direction to move the planetary gear to the neutral position after completion of document reading.

7. The document reading apparatus as claimed in claim 5, wherein the planetary gear is rotatably attached to an arm and the holder comprises a leaf spring attached to the arm.

8. The document reading apparatus as claimed in claim 3, further comprising a transmission unit that transmits information related to a result of reading the document, a copying unit that forms an image on a recording paper based on the result of reading the document, and a switch that switches between the transmission unit and the copying unit depending on which unit is used, wherein the determiner determines the resolution based on the result of switching by the switch.

9. The document reading apparatus as claimed in claim 8, having at least a resolution appropriate to the communication standards and a resolution suitable for image copying, wherein the determiner and the selector are arranged so that the result of determination by the determiner corresponds to the result of selection by the selector in such a manner that the driving path for the resolution appropriate to the communication standards is selected when the use of the transmission unit is selected by the switch, and the driving path for the resolution suitable for image copying is selected when the use of the copying unit is selected.

10. The document reading apparatus as claimed in claim 1, wherein the driving member comprises a feeding member.

11. The document reading apparatus as claimed in claim 10, wherein the feeding member comprises a feed roller that feeds the document in the document feeding direction while making contact therewith; the driving power source comprises a rotation driving power source that rotationally drives the feed roller; the power transmitting mechanism transmits rotation driving power from the rotation driving power source to the feed roller; and the plurality of driving paths comprises two driving paths, each having a reduction ratio different from the other corresponding to one of two resolutions.

12. The document reading apparatus as claimed in claim 11, wherein each of the two resolutions is not an integral multiple of the other.

13. A method for a document reading apparatus which can read a document along a predetermined direction at a plurality of resolutions, the document reading apparatus comprising a reading unit for reading the document, a driving member for driving at least one of the document or the reading unit to shift a document reading position in the predetermined direction and a driving power source for driving the driving member, the method comprising:

providing a power transmitting mechanism including a plurality of driving paths, each driving path having a reduction ratio different from the other corresponding respectively to one of the plurality of resolutions, for transmitting driving power from the driving power source to the driving member;

determining which of the plurality of resolutions to select; and selecting a one of the plurality of driving paths as a driving path for transmitting the driving power, the driving path having a reduction ratio corresponding to the determined resolution so that the driving member is driven at a speed corresponding to the determined resolution.

14. The method as claimed in claim 13, wherein the step of selecting a one of the plurality of driving paths as a driving path for transmitting the driving power comprises engaging a planetary gear with one of selecting gears provided respectively at input ends of the two driving paths depending on a direction of rotation of a motor, and further comprising the step of:

changing the direction of rotation of the motor according to the result of the resolution determination.

15. The method as claimed in claim 14, further comprising the step of holding the planetary gear in a neutral position where the planetary gear is not engaged with either of the selecting gears which are provided respectively for the two driving paths in between document reading operations.

16. The method as claimed in claim 15, wherein the step of engaging a planetary gear with one of selecting gears comprises rotating the motor in a first direction to engage the planetary gear with one of the selecting gears to begin document reading and rotating the motor in a second direction opposite to the first direction to move the planetary gear to a neutral position after completion of document reading.

17. The method as claimed in claim 13, further comprising the step of switching between a transmission unit that transmits information related to a result of reading the document and a copying unit that forms an image on a recording paper based on the result of reading the document; and basing the resolution determination on the result of the switching.

18. A document reading apparatus which can read a document along a predetermined direction at a plurality of resolutions, the document reading apparatus comprising a reading unit for reading the document, a driving member for driving at least one of the document or the reading unit to shift a document reading position in the predetermined direction and a driving power source for driving the driving member, the document reading apparatus comprising:

means for transmitting driving power from the driving power source to the driving member including a plurality of driving paths, each driving path having a reduction ratio different from the other corresponding respectively to one of the plurality of resolutions;

means for determining which of the plurality of resolutions to select; and means for selecting a one of the plurality the driving paths as a driving path for transmitting the driving power, the driving path having a reduction ratio corresponding to the determined resolution so that the driving member is driven at a speed corresponding to the determined resolution.

19. The document reading apparatus as claimed in claim 18, wherein the means for selecting comprises a planetary gear which engages, depending on a direction of rotation driving power, with one of selecting gears provided respectively at input ends of the plurality of driving paths, and further comprising:

means for changing the direction of rotation driving power according to the result of the resolution determination.

20. The document reading apparatus as claimed in claim 18, further comprising means for switching between a transmission unit that transmits information related to a result of reading the document and a copying unit that forms an image on a recording paper based on the result of reading the document, wherein the means for determining determines the resolution based on the result of the switching by the means for switching.

21. A document reading apparatus which can read a document along a predetermined direction at a plurality of resolutions, the document reading apparatus comprising:

a reading unit that reads the document;

a driving member that drives at least one of the document and the reading unit to shift a document reading position in the predetermined direction;

a driving power source that drives the driving member; and a power transmission that transmits driving power from the driving power source to the driving member, the power transmission comprising a plurality of driving paths, each having a reduction ratio different from the other and corresponding respectively to one of the plurality of resolutions, and a selector that selects any one of the driving paths as a driving path for transmitting the driving power so that the driving member is driven to shift a document reading position in the predetermined direction an amount per rotation of the driving power source corresponding to the respective resolution associated with the selected driving path.

22. A document reading apparatus which can read a document along a predetermined direction at a plurality of resolutions, the document reading apparatus comprising:

a reading unit that reads the document;

a driving member that drives at least one of the document and the reading unit to shift a document reading position in the predetermined direction;

a driving power source that drives the driving member; and a power transmission that transmits driving power from the driving power source to the driving member, the power transmission comprising a plurality of driving paths, each having a reduction ratio different from the other and corresponding respectively to one of the plurality of resolutions, and a selector that selects any one of the driving paths as a driving path for transmitting the driving power so that the driving member is driven to drive at least one of the document and the reading unit to shift the document reading position in the predetermined direction by a shift amount corresponding to a minimum driving amount of the driving power source, wherein the shift amount corresponding to a minimum driving amount varies depending on each resolution associated with the selected driving path.

23. The document reading apparatus according to claim 22, wherein the driving power source comprises a pulse motor and the minimum driving amount comprises a rotation amount per one step of the pulse motor.

24. The document reading apparatus according to claim 23, wherein the pulse motor is a bi-directional rotatable motor.

* * * * *